United States Patent Office 3,451,786
Patented June 24, 1969

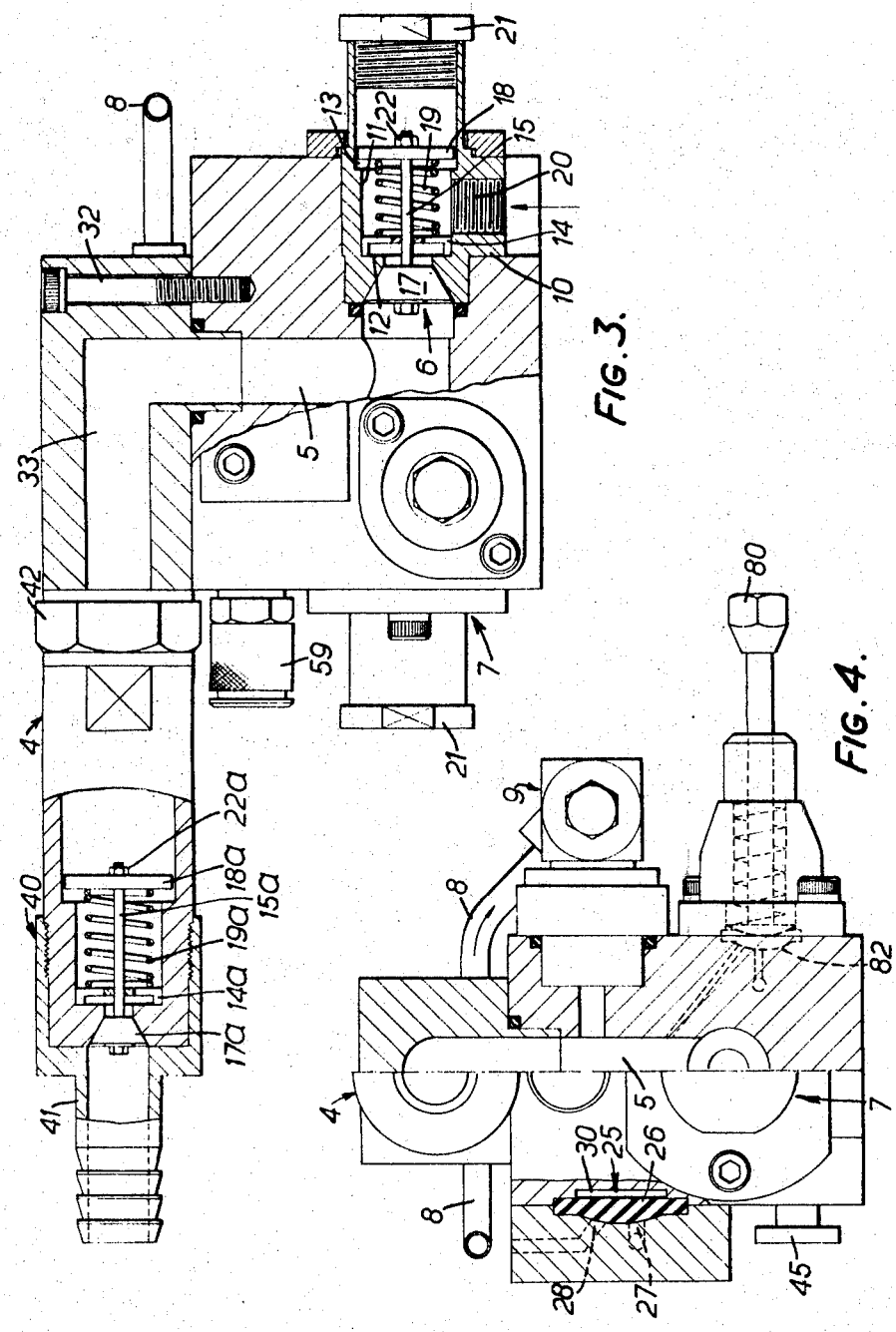

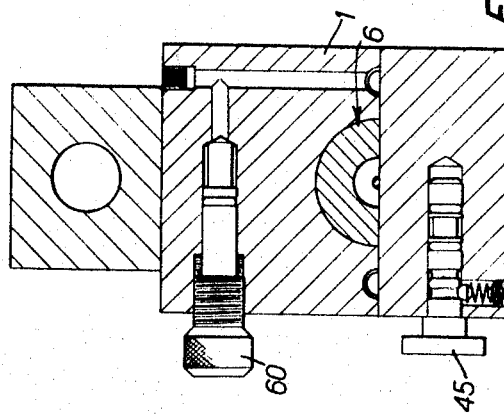
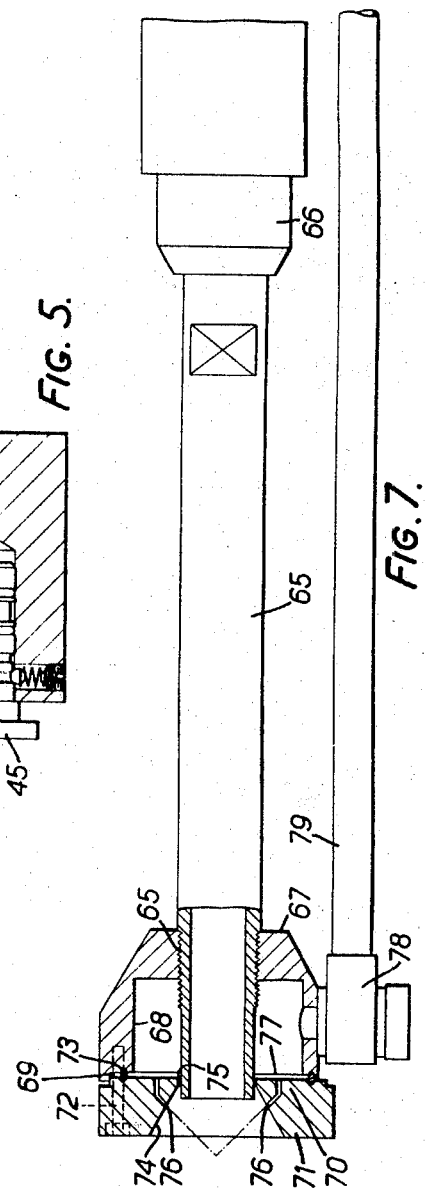

3,451,786
DEVICE FOR MIXING AND DISPENSING
INGREDIENTS
Alan P. Perrin, Kenley, England, assignor to
Perameters Company Limited
Filed Feb. 8, 1966, Ser. No. 525,935
Claims priority, application Great Britain, Feb. 11, 1965,
5,946/65
Int. Cl. B01j
U.S. Cl. 23—285                                    9 Claims

ABSTRACT OF THE DISCLOSURE

A dispenser for mixing and dispensing the ingredients for producing a foamed polyurethane body comprising a housing having a mixing chamber, an inlet thereto for a preexpanding agent, tt least two valved inlets thereto for a polyol, an isocyanate, and a catalyst, and a valved outlet from the chamber. The valves at the inlets and outlets operate so as to prevent expansion of the material in the housing with the outlet valve opening only at a pressure in excess of the pressure at which the preexpanding agent will volatilize. This abstract is intended neither to limit nor define the scope of the invention.

This invention is concerned with improvements in and relating to dispensers and more particularly dispensers for receiving, mixing and discharging the components which go to form a foamed polyurethane body. The components to be brought together, mixed and discharged are a polyol, a polyisocyanate, a preexpanding agent and a catalyst of which the polyol and catalyst are generally already mixed and therefore have to be added to the polyisocyanate and the preexpanding agent which is itself a low boiling point liquid.

According to the invention there is provided a device for mixing and dispensing the ingredients for producing a foamed polyurethane body comprising a mixing chamber, at least two inlets thereto for a polyol, an isocyanate and a catalyst and an inlet for a preexpanding agent in liquid form, and an outlet from the chamber which will open only at a pressure in the chamber in excess of the pressure at which the preexpanding agent will volatilize. Thus in operation the expansion of the material in the housing is prevented. The housing is preferably provided with baffle means to assist in obtaining an intimate mixing of the components and where the two components to be expanded by the preexpanding agent are not readily miscible, and one having a relatively low surface tension, a housing extension may be provided having an outlet controlled by valve means which will open only under a pressure greater than atmospheric but below that at which the housing outlet valve will open. Thereby the surface tension of the material subjected to the expanding action will build up in the housing extension before the material is exposed to atmospheric pressure.

Figure 1:
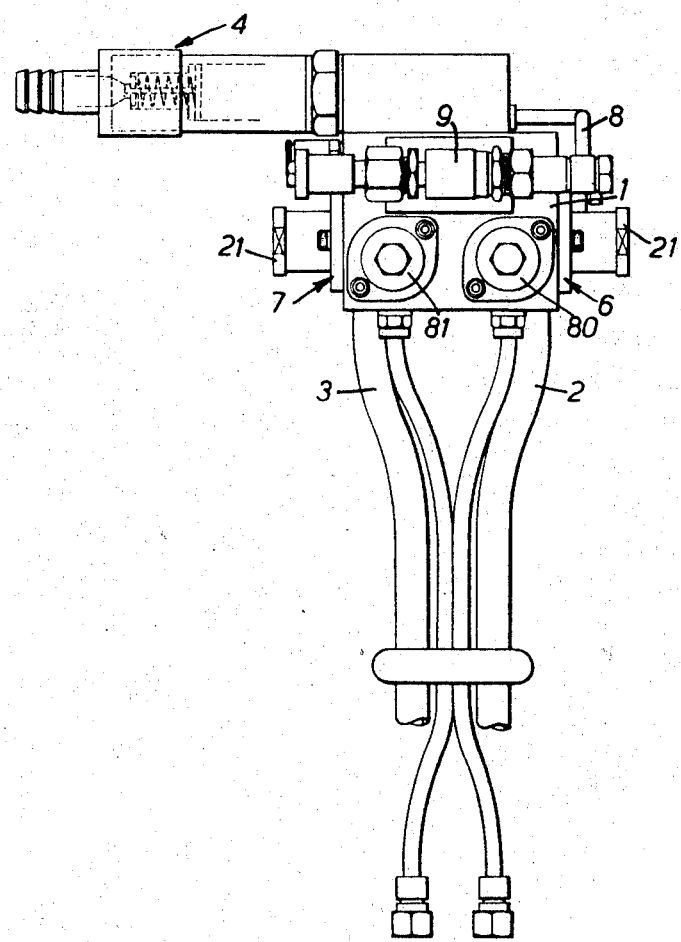
Figure 2:
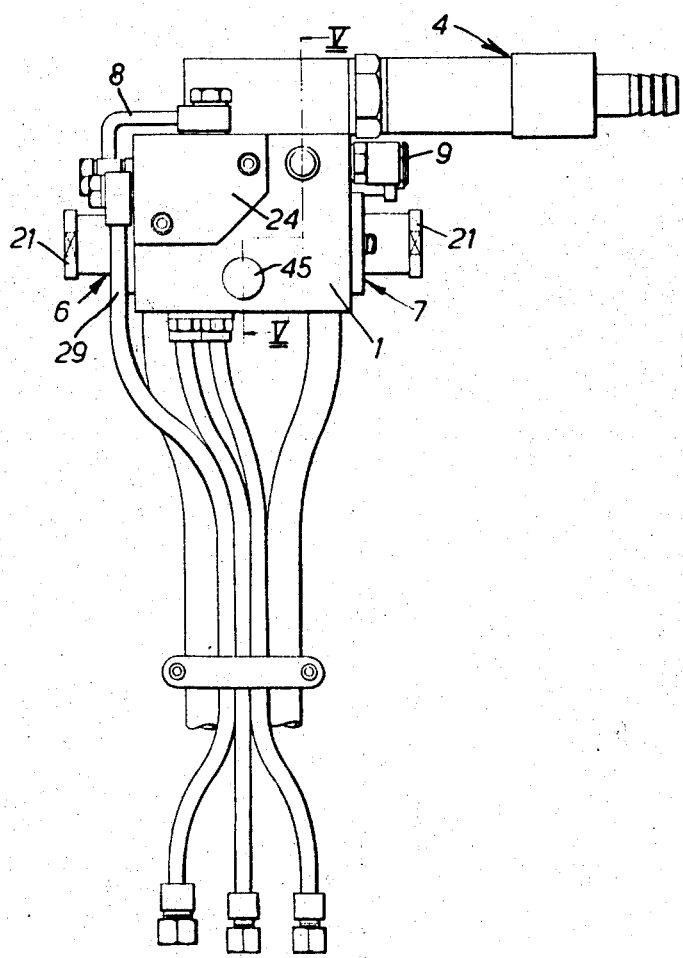
Figure 6:
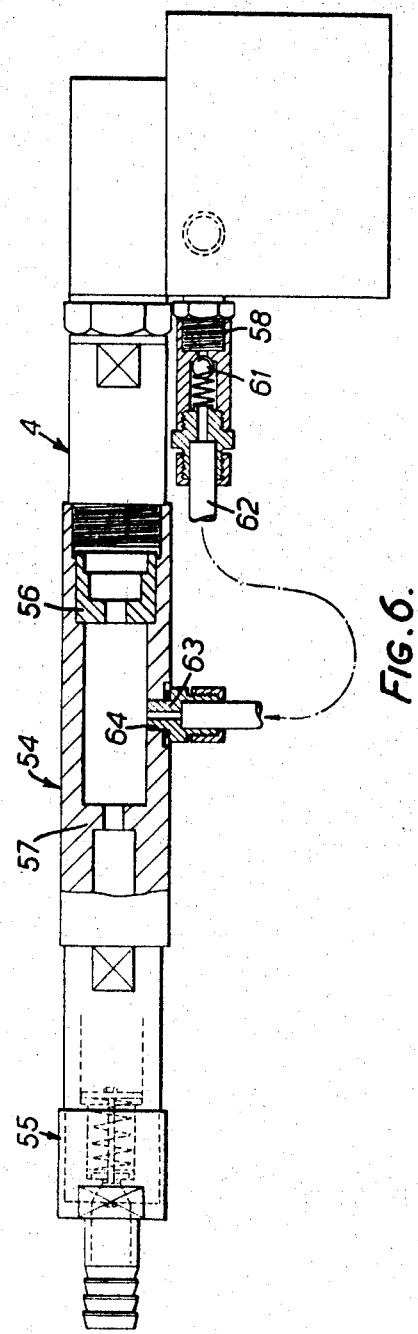

In order that the present invention may be well understood there will now be described an embodiment thereof, given by way of example only, reference being had to the accompanying drawings in which:

FIGURE 1 is a side elevation of a dispensing gun assembly for polyurethane foam material, FIGURE 2 is an elevation of the other side of the gun, FIGURE 3 is an axial section of the gun portion only of FIGURE 1, FIGURE 4 is a part sectioned front elevation with the gun needle valve removed, FIGURE 5 is a section on the line V—V of FIGURE 2, FIGURE 6 is a section of an outlet extension, and FIGURE 7 is a section through a foam spray head, The dispensing gun is portable and comprises a body 1 secured to a pair of rigid pipes 2, 3 which serve inter alia to assist in handling.

The gun body carries a dispensing head 4 extending from a mixing chamber 5 communication between which and the pipes 2, 3 is by way of valves 6, 7. The chamber also communicates with an expanding agent line 8 by way of a needle valve 9.

Referring particularly to FIGURE 3 the mixing chamber control valves 6, 7 are diametrically opposed and each includes a valve body 10 set in a bore of body 1 opening into the mixing chamber. The body has a bore 11 stepped at 12, 13 against which steps bear respectively a guide 14 for valve spindle 15 extending from valve head 17 and stop member 18 on valve spindle 15 when the valve is forced open against the action of a spring 19 bearing on the guide 14 and stop member 18. To the bore of an inlet port 20 in the valve body is threaded a union (not shown) fast with the associated rigid pipe 2 or 3. A plug 21 seals the valve body bore and gives access to adjust the compression of spring 19 by way of a nut 22 on the valve spindle.

The needle valve 9 is of conventional form, controls the flow rate in line 8, and is fed through line 8 which runs to a control block 24 which acts as an on/off valve. This block includes a diaphragm chamber 25 having a diaphragm 26 seating on ports 27, 28 communicating respectively with a supply pipe 29 and the line 8. The diaphragm is urged to seat on the ports by air supplied to the diaphragm chamber region 30, on the opposite face of the diaphragm from the ports, from a suitable source in the body coupled to a flexible air supply pipe.

The dispensing head is secured to the gun body by bolts such as 32 and includes a bore 33 at right angles to the mixing chamber. This causes a change of direction of the ingredients to the chamber which improves the mixing action. At the outlet of the head is a valve generally indicated at 40 similar in construction to the valves 6, 7, the parts of valve 40 similar with valves 6, 7 being indicated by the same references as those of valves 6, 7 but with the suffix a. The valve body is formed by the wall surrounding the head bore and the materials pass into the valve axially through the valve stop member 18a. A connection 41 for a hose extends from the head, such a hose in certain cases being desirable in that it improves mixing. The head is constructed as two parts united by the coupling nut 42.

In operation polyol and catalyst may be pumped to one of the valves 6, 7 and poly isocyanate to the other, and a liquid preexpanding agent, which may be a halogenated fluorocarbon such as R-12, is fed to the block 24. The liquid ingredients are preferably continuously pumped by means not shown between a reservoir for each and back to the reservoir and operation of the gun may be suitably triggered off by a control button 45 which on depression remotely taps off (by means not shown) the continuously pumped ingredients from their recycle paths to the reservoir to the valves 6, 7 and exhausts air from region 30 to allow the agent in line 29 to move the diaphragm 26 off the ports 27, 28 to allow the preexpanding agent to reach the needle valve 9.

The ingredients arriving at valves 6, 7 will lift those valves off their seats and the ingredients and expanding agent will meet in the mixing chamber. The diametric opposition of valves 6, 7 assists in obtaining a mix of the liquid ingredients. The dispensing head valve will be preset to lift only at a pressure in the chamber and dispensing head bore in excess of that at which the preexpanding agent will volatilize, in the case of R-12 at 80 lb. per square inch.

As the components are introduced, the pressure in the chamber rises but no volatizing of the preexpanding agent occurs due to the loading of the outlet valve. As this valve lifts the inlet valves will lift further and conversely if the pressure in the chamber falls the inlet valves will move towards their seat so that the conditions in the chamber are always such that the expansion takes place outside the outlet over a wide range of throughput and viscosity.

Where the two components to be mixed with the preexpanding agent are not readily miscible, e.g., where one has a higher viscosity than the other, and the surface tension of one component is low, then the discharge of mixture to atmospheric pressure will result in the collapse of the foam. Accordingly, referring to FIGURE 6, there is provided an outlet extension 54 for the dispenser which can be fitted in place of the hose extension 41. The extension has an outlet valve 55, similar to the outlet valve of the dispensing head, set to open at a pressure above atmospheric but below that at which the head outlet valve opens. Additionally a baffle member 56 is fitted in the extension as well as an integral baffle 57 to continue the mixing of the components. By this arrangement the components will begin to react and expand in the housing, surface tension will rise and the foam will not collapse on discharge.

Whilst a spring loaded plunger type of valve is at present preferred for the inlets and outlet it will be understood that other valve means may be adopted, particularly at the outlet where the requirement is that there shall be a flow conrol of cross-section which will vary with pressure variation in the housing, the flow only being permitted to start on the desired predetermined pressure being achieved in the housing and closing when that pressure falls below the predetermined level.

It may be desired to increase turbulence in the extension and in this case an air supply port 58 in the body, normally sealed by plug 59 and controlled by needle valve 60 is coupled by nonreturn valve 61, fitted in place of plug 59, and a flexible pipe 62 to a small bore, for example, .093 inch internal diameter, head 63 threaded into a socket 64 in the wall of the extension. In operation the ingredients are first fed to the mixing chamber, lift the mixing chamber outlet valve, enter the extension, lift the extension outlet valve and then air is supplied to the extension chamber. Any ingredients which enter the small bore head are blown back into the extension by the air.

In certain cases it may be desired to inject air into the mixed ingredients dispensed by the gun. For this purpose a spray head may be fitted in place of the hose connection shown in FIGURE 3. This spray head is shown in FIGURE 7 and comprises a pipe 65 carrying a union 66 which threads on to the dispensing head of the gun. The other end of the pipe is stepped and threaded and receives a reservoir piece 67 having a bore 68 stepped at 69 to receive an annular projection 70 on a bleed head 71. Bleed head 71 is held to reservoir piece 67 by screws 72, an O-ring 73 being provided to seal the joint between the piece and the head. The head has a conical bore 74 leading into a cylindrical bore 75 through which pipe 65 extends with a clearance of the order of .015 inch. In the head are four drillings 76 spaced about the axis by 90°. Each drilling opens to the inner face 77 of the head and to the conical bore. One pair of diametrically opposed drillings have their axes disposed at the conical bore at 45° to the axis of the bore while the drillings of the other pair have their axes at that bore at 15° to the axis of the bore. A banjo union 78 couples the bore to the reservoir piece with a pipe 79 which is coupled to the air supply port controlled by the air supply needle valve. In operation the mixed ingredients are dispensed through pipe 65 and air issuing from the drillings aerates the stream of ingredients while air issuing from the clearance round the pipe 65 keeps the stream confined against the disruptive effect of the air streams from the drillings.

To clean the gun a pair of manually operable controls 80, 81 are provided to normally brace diaphragms into seating engagement one with an air supply port and pump air feed port communicating with the mixing chamber and the other with a solvent supply port and a port communicating with the mixing chamber. Such a diaphragm 82 is indicated diagrammatically in FIGURE 4.

What I claim is:

1. A device for mixing and dispensing ingredients such as ingredients for producing a foamed polyurethane body, comprising a mixing chamber having first and second openings admitting to said mixing chamber and providing first and second inlets for some of said ingredients, each opening being defined by a valve seat cooperating with a valve closure member biased to close said opening, a third opening admitting to said mixing chamber and providing an inlet for a further ingredient, and a fourth opening admitting to said mixing chamber and providing an outlet for the mixed ingredients, said fourth opening being defined by a valve seat cooperating with a valve closure member biased to close said outlet, the device being such that the ingredients supplied under pressure to said first and second openings will lift said valve closure members for said first and second openings off their seats to admit the ingredients to said mixing chamber and that the valve closure member for said fourth opening will lift off its seat to dispense the mixed ingredients when a preset pressure is attained within said mixing chamber.

2. A device according to claim 1 in which the axis of the mixing chamber between the inlets and outlet changes direction.

3. A device according to claim 1 in which the third inlet of said mixing chamber is coupled to a source of said further ingredient through valve means for controlling the flow of said further ingredient into said mixing chamber.

4. A device according to claim 1 in which the outlet opens into an extension mixing chamber itself having an outlet valve set to open at a pressure in the extension mixing chamber above atmospheric but below the opening pressure of the valve for the outlet of the mixing chamber.

5. A device according to claim 4 including baffle means in the extension mixing chamber.

6. A device according to claim 4 including an inlet port in the extension mixing chamber for feeding a gas into that chamber.

7. A device according to claim 1 in which the outlet opens into a conduit at the free end of which is a head having a conical bore whose surface forms a divergent outlet for foam from the conduit and a plurality of outlets from said surface converging in the direction of mixed ingredient discharge with the axis of the conduit, a coupling being provided coupling the outlets from said surface with a source of gas under pressure.

8. A device according to claim 7 in which pairs of diametrically opposed outlets from said surface are provided, the axes of one pair each making an angle of 45° with the axis of the conical bore of the head and the axes of another pair of each making an angle of 15° with the axis of the conical bore of the head.

9. A device for mixing and dispensing ingredients such as ingredients for producing a foamed polyurethane body, comprising:
   a mixing chamber;
   first and second openings admitting to said mixing chamber and providing first and second inlet means for some of the ingredients, each opening being defined by a valve seat cooperating with a valve closure means biased to normally close said opening whereby when ingredients are supplied under pressure to said two openings said valve closure means will lift off their respective seats admitting the ingredients to said mixing chamber;

a third opening admitting to said mixing chamber and providing a third inlet means for a further ingredient, coupling means for coupling said third opening to a source of said further ingredient, said coupling means comprising a chamber with an inlet port coupled to said source of further ingredient and an outlet port coupled to said third opening through a needle valve means for controlling the flow rate of said further ingredient into said mixing chamber, said chamber having a diaphragm means therein for co-operating with said inlet and outlet ports to control the flow of said further ingredient from said source to said needle valve means, said chamber having port means coupled to a source of fluid under pressure and an exhaust means whereby when fluid under pressure is admitted to said chamber through said port means said diaphragm means sealingly engages said inlet and outlet ports to stop the flow of said further ingredient to said needle valve and whereby when said chamber is exhausted through said port means, the pressure of said further ingredients against said diaphragm lifts the diaphragm off said inlet and outlet ports to permit the passage of said further ingredient through said chamber to said needle valve means;

a fourth opening admitting to said mixing chamber and providing an outlet for the mixed ingredients, said fourth opening being defined by a valve seat cooperating with a valve closure means biased to close said outlet, whereby when a preset pressure is attained within said mixing chamber said valve closure means for said fourth opening will lift off its seat to dispense the mixed ingredients into a conduit at the free end of which is a head having a conical bore having a surface which forms a divergent outlet for foam from said conduit and said conical bore having a plurality of outlets in said surface converging in the direction of mixed ingredients discharge with the axis of said conduit, a coupling means being provided coupling the outlets in said surface with a source of gas under pressure.

References Cited

UNITED STATES PATENTS

| | | | |
|---|---|---|---|
| 3,353,918 | 11/1967 | Perrin | 23—285 XR |
| 3,232,709 | 2/1966 | Cole | 23—252 |
| 3,220,801 | 11/1965 | Rill et al. | 23—252 |
| 3,073,533 | 1/1963 | Weinbrenner et al. | 239—428 XR |
| 3,049,439 | 8/1962 | Coffman | 239—428 XR |
| 2,990,252 | 6/1961 | Geldern et al. | 23—252 |
| 2,665,197 | 1/1954 | Rowland | 23—285 |

JAMES H. TAYMAN, JR., *Primary Examiner.*

U.S. Cl. X.R.

23—252; 239—428; 259—7, 8; 260—2.5